United States Patent [19]

Brunnett et al.

[11] 3,732,420
[45] May 8, 1973

[54] AUTOMATIC CALIBRATION SYSTEM FOR A SCINTILLATION DEVICE

[75] Inventors: Carl J. Brunnett, Mayfield Heights; Basil N. Ioannou, Bedford, both of Ohio

[73] Assignee: Picker Corporation, Cleveland, Ohio

[22] Filed: June 25, 1971

[21] Appl. No.: 156,912

[52] U.S. Cl. ............... 250/71.5, 250/83 C, 250/83.3
[51] Int. Cl. ............................................. G01j 39/18
[58] Field of Search ................... 250/83.3, 83 C, 71.5

[56] References Cited

UNITED STATES PATENTS

| | | | |
|---|---|---|---|
| 2,640,788 | 6/1953 | Rockett | 250/83.3 R |
| 3,612,876 | 11/1971 | Grant | 250/83 C |
| 3,198,944 | 8/1965 | Furbee | 250/83.3 R |

Primary Examiner—James W. Lawrence
Assistant Examiner—Harold A. Dixon
Attorney—Watts, Hoffman, Fisher & Heinke

[57] ABSTRACT

A scintillation device, such as a scintillation scanner, having a calibrate system for automatically calibrating the value of data signals representative of measured radiation activity in response to the value of reference signals representative of the level of maximum radiation activity, i.e., signals representative of radiation activity at a calibration point or a "hot spot." The calibrate system utilizes circuitry for counting the number of signals which occur at the calibration point for a predetermined number of intervals of time, and then dividing the number of counted signals by the number of intervals of time to develop calibration signals having a high degree of statistical accuracy. The values of the data signals obtained during the normal operation are then calibrated with reference to the calibrate signals to that the data signals always remain within a preselected range of values regardless of the levels of measured radiation activity.

15 Claims, 6 Drawing Figures

INVENTORS
CARL J. BRUNNETT
BY BASIL N. IOANNOU
ATTORNEYS 3,732,420

AUTOMATIC CALIBRATION SYSTEM FOR A SCINTILLATION DEVICE

CROSS REFERENCES TO RELATED PATENTS AND PATENT APPLICATIONS

U.S. Letters Pat. No. 3,070,695, to Joseph B. Stickney et al., entitled, "Scintillation Scanner" issued on Dec. 25, 1962, and assigned to the same assignee as the present application.

U.S. Letters Pat. No. 3,159,744, to Joseph B. Stickney et al., entitled, "Scintillation Scanner Photo-Circuit" issued on Dec. 1, 1964, and assigned to the same assignee as the present application.

U.S. Pat. application, Ser. No. 660,823, entitled, "Scintillation Recording Device," filed on Aug. 15, 1967, and assigned to the same assignee as the present application.

U.S. Pat. application Ser. No. 156,913 to Carl J. Brunnett et al, entitled, "High Speed Color Printer for Scintillation Scanner," filed June 25, 1971 and assigned to the same assignee as the present application.

BACKGROUND OF THE INVENTION

This invention pertains to the art of scintillation devices for providing a graphical presentation of the levels of radioactivity over an area, and more particularly, to an automatic calibrate system for calibrating the signals representative of levels of radiation activity in response to the value of signals representative of the level of maximum radiation activity.

In the above-referenced patents to Joseph B. Stickney et al, a scintillation device of the type which is generally referred to as a "scintillation scanner" is disclosed. With a scintillation scanner, a scintillation probe is supported on a boom which reciprocates along a series of parallel rectilinear paths to cover a predetermined area of examination. A light source and a stylus are also carried by the boom to reciprocate along paths of travel which correspond to and are parallel to the path of travel of the probe. The light source and stylus are coupled through appropriate circuitry to the scintillation probe to produce graphic images, on both a film and a sheet of paper, of the levels of radiation activity being measured.

In the medical use of a scintillation device, a radioactive isotope is administered to a patient. Isotopes exhibit the characteristic of concentrating in certain types of tissue with the level of concentration dependent upon the type of tissue. These different levels of concentration result in different levels of radiation activity which, when measured and graphically presented, provide a basis for medical diagnosis. The levels of concentration of the isotopes are not only different in different tissues of a single organ, but are also different between similar tissues in similar organs. For this reason, the levels of maximum concentration, or maximum radiation activity, may vary over a wide range for different organs or even for two similar organs.

With the wide range of maximum concentrations, or maximum radiation activity, in human organs, it is necessary to compensate or recalibrate the signals developed by the scintillation device for each study. In other words, if a color recording type scintillation scanner is calibrated such that 20,000 counts per minute produce on the graphical presentation an indication of maximum density, i.e., a magenta mark in a system such as that disclosed in the above-referenced application, Ser. No. 660,823, the operator will be unable to distinguish between levels of radiation activity in excess of 20,000 counts per minute because these levels will all be represented by a magenta mark. Conversely, if the scanner is calibrated such that 30,000 counts per minute produce on the graphical presentation an indication of maximum density, and the actual maximum of radiation activity never exceeds 15,000 counts per minute during a given study, the graphical presentation will include no magenta or red marks and will be comprised of only blue and green marks and combinations thereof. For optimum results, the graphical presentation should include substantially the entire color spectrum produced by the red, green and blue light sources, and the maximum density, i.e., a magenta mark, should appear on the graphical presentation only in response to the maximum counts per minute or "hot spot" during a given study.

In the past, it was necessary to manuallly calibrate the signals developed by a scanner so that the graphical presentation included the entire color spectrum. This manual calibration was generally carried out by moving the detector probe over a "hot spot" and then attempting to read the scale of a rate meter in order to determine the approximate number of counts per minute occurring at the "hot spot." The reading taken from the rate meter was then used to compute the gain setting of a variable gain amplifier so that the signals applied to a readout device generally remain within a predetermined range of values.

As may be apparent, the procedure of visually reading a rate meter in order to calibrate a scanner inherently results in numberous calibration inaccuracies. For example, the rate meter readings vary over a rather wide range because of statistical variations in the number of counts per minute. Thus, the reading taken by the operator are at best an approximation of the average number of counts per minute. Also, the inertia in the meter movement of the rate meter adds an additional factor of inaccuracy to these measurements. In addition, manual calibration of the scintillation scanner prior to each diagnostic study is a time consuming procedure.

SUMMARY OF THE INVENTION

The present invention is directed toward a calibrate system for scintillation devices for automatically calibrating the signals developed by the scintillation device so that the signals remain within a predetermined range of values during a given study, thereby overcoming the noted disadvantages, and others, of such previous systems.

In accordance with one aspect of the present invention, there is provided a radiation detector including circuitry for developing a train of electrical pulses representative of the value of radiation activity measured by the detector. A counting circuit is coupled to the detector for developing a plurality of patterns of electrical signals each having a value representative of the number of electrical pulses received during a predetermined time interval. A digital-to-analog converter is coupled to the counting circuit for converting the electrical signals to a plurality of output signals each having a value representative of one of the patterns of electrical signals. An automatic calibrating circuit is coupled to the digital-to-analog converter for modifying the values of the output signals in a manner so that the values of the output signals never exceed a predetermined value and these signals remain representative of the value of the signals developed by the counting circuit. A printout device is coupled to the digital-to-analog converter for providing an output indication of measured radiation activity.

In accordance with another aspect of the present invention, there is provided a method of calibrating a scintillation recording apparatus. The method includes the steps of positioning a radiation detector in proximity to a subject under examination at an area of substantially maximum radiation activity, developing a train of electrical pulses representative of the level of radiation activity measured by the detector, and electrically counting the number of electrical pulses for D intervals of time. The method also includes the steps of electrically dividing the number of electrical pulses by D in order to obtain an average number of electrical pulses occurring in one time interval, developing a calibration signal having a value representative of the average number of electrical pulses in the time interval, positioning the radiation detector in proximity to another area of radiation activity, and developing a second train of electrical pulses representative of the radiation activity measured by the detector at the second position.

In operation, the method additionally includes the steps of counting the number of electrical pulses in the second train of pulses which are developed in a predetermined interval of time, developing an output signal having a value representative of the number of counted pulses in the second train of pulses, and modifying the value of the output signal with the calibration signal so that the value of the output signal remains within a predetermined range of values and remains representative of the number of counted pulses in the second train.

It is therefore an object of the present invention to provide an automatic calibrate system for a scintillation device.

Another object of the present invention is to provide a scintillation scanner untilizing digital circuitry for improved accuracy over previous analog scanners.

Another object of the present invention is to provide a calibrate system for a scintillation device which rapidly and with a high degree of statistical accuracy calibrates the operation of the scintillation device.

It is another object of the present invention to provide a calibrate system for a scintillation device which automatically calibrates the scintillation device with reference to a level of activity occurring at a "hot spot."

Another object of the present invention is to provide a scintillation device having digital circuitry for counting pulses representative of a level of radiation activity at a "hot spot" for a predetermined number of intervals of time and for dividing the number of counts by the number of time intervals in order to obtain a calibrate reference level with a high degree of statistical accuracy.

Another object of the present invention is to provide a calibrate system for a scintillation device for automatically setting the film density or color level of the recording device.

A further object of the present invention is to provide a scintillation device having improved contrast enhancement.

A further object of the present invention is to provide a scintillation device having improved intensity control.

Another object of the present invention is to provide a method of automatically calibrating the operation of a scintillation device.

These and other objects and advantages of the invention will become apparent from the following description of the preferred embodiment of the invention as read in conjunction with the accompanying drawings in which:

DESCRIPTION OF THE PREFERRED EMBODIMENT

Figure 1:
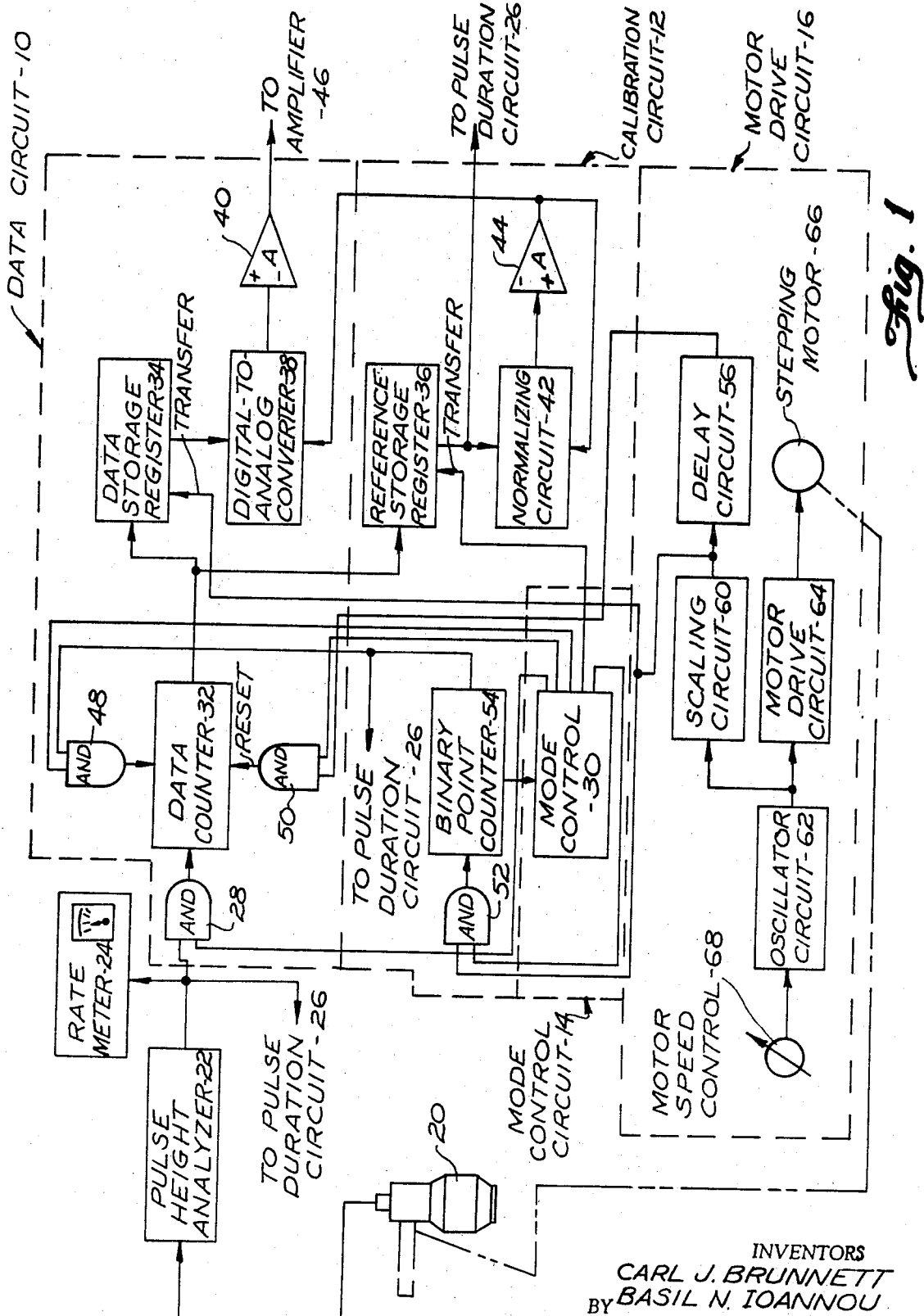
FIGS. 1 and 2 are electrical block diagrams illustrating in basic form the automatic calibration system of the present invention in conjunction with a scintillation scanner.
Figure 2:
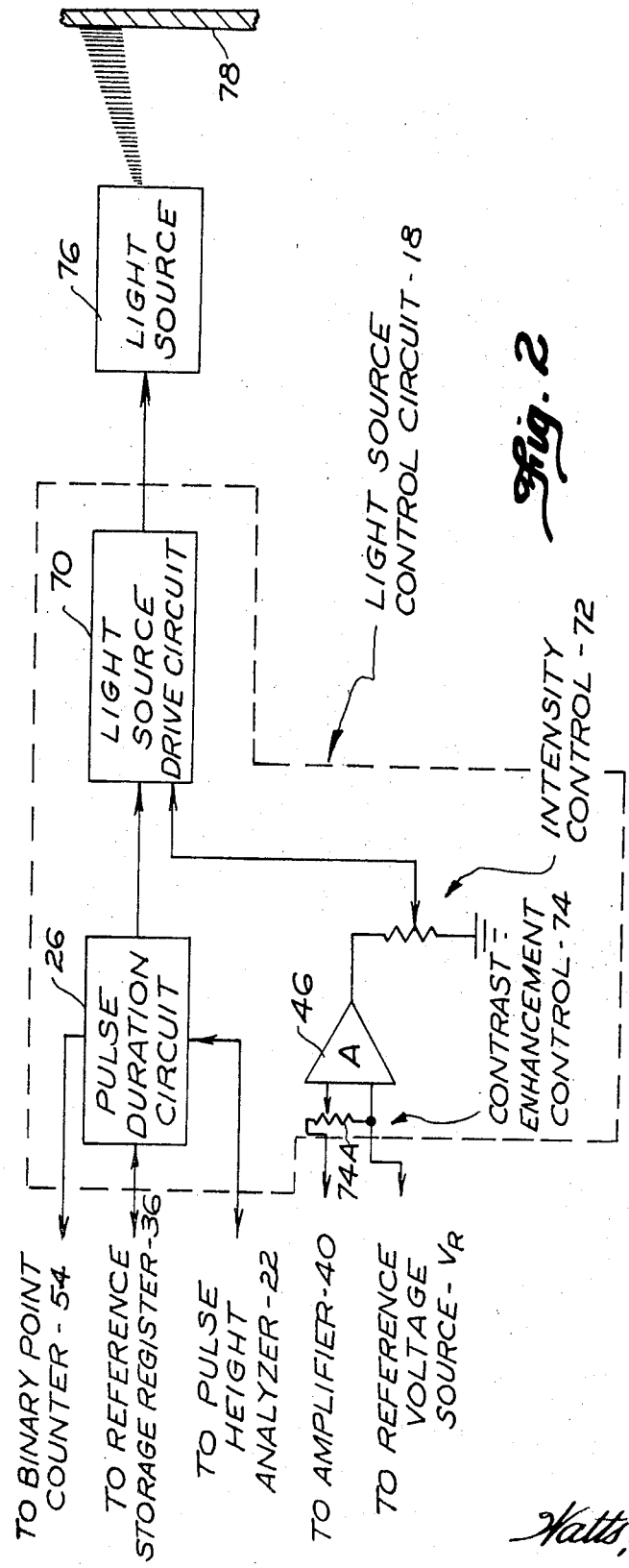

FIGS. 1 and 2 illustrate an automatic calibrate system in conjunction with a scintillation scanner. The automatic calibrate system generally comprises a data circuit 10, a calibration circuit 12, a mode control circuit 14, a motor drive circuit 16, and a light source control circuit 18. More particularly, the input terminal of the data circuit 10 is coupled to the output of a radiation detector probe 20 through a pulse height analyzer 22. The output terminal of the pulse height analyzer 22 is connected to a rate meter 24 and to a pulse duration circuit 26 in the light source control circuit 18. The radiation detector probe 20, pulse height analyzer 22, and rate meter 24 are conventional elements and are described in more detail in the above-referenced U.S. Pat. No. 3,159,744.

As illustrated in FIG. 1, the output of the pulse height analyzer 22 is connected to one of the input terminals of an AND gate 28 having its other input terminal connected to a mode control 30. The output of AND gate 28 is connected to the input terminal of a data counter 32 and the output terminals of the data counter 32 are connected to a data storage register 34 and a reference storage register 36.

The output terminals of the data storage register 34 are connected to a digital-to-analog converter 38 having its output terminal connected to the input terminal of a differential amplifier 40. The output terminals of the reference storage register 36 are connected to the input terminals of a normalizing circuit 42 having its output terminal connected to the input of a differential amplifier 44. The output terminal of the differential amplifier 44 is fed back to the digital-to-analog converter 38 and to the normalizing circuit 42 in order to modify the signals developed in these circuits in response to the number of counts stored in the reference storage register 36. The output terminal of the differential amplifier 40 is coupled through a contrast enhancement control 74 to a differential amplifier 46 in the light source control circuit 18, and the output terminals of the reference storage register 36 are coupled to the pulse duration circuit 26 in the light source control circuit 18. The contrast enhancement control 74 includes a potentiometer 74a having a movable contact coupled to one of the input terminals of amplifier 46, a stationary contact connected to amplifier 40, and a stationary contact connected in common to a reference voltage source $V_R$ and the other input terminal of amplifier 46.

The mode control 30 is generally comprised of circuitry for gating appropriate ones of a plurality of AND gates in response to selected modes of operation, to wit, "calibrate" mode and "normal" mode. The mode control 30 also serves to strobe the reference register 36 at the appropriate time to cause the stored binary-coded-digital information to be transferred from the reference storage register 36 to the normalizing circuit 42.

Accordingly, the mode control circuit 30 in addition to being connected to one of the input terminals of the AND gate 28, is connected to one of the input terminals of the AND gates 48, 50, 52, as well as the transfer terminal of the reference storage register 36. The other input terminal of the AND gate 48 is coupled to the output terminal of a binary point counter 54, the other input terminal of the AND gate 50 is coupled to the output terminal of a delay circuit 56 in the motor drive circuit 16, and the other input terminal of the AND gate 52 is coupled to an output terminal of a scaling circuit 60 in the motor drive circuit 16.

The AND gate 48 is shown as a single AND gate in FIG. 1 for purposes of illustration, but in practice in the form of a plurality of AND gates as will be described subsequently. This AND gate sets the binary point in the data counter 32 in response to the number of counts contained in the binary point counter 54. As illustrated, the output terminal of the AND gate 50 is connected to the reset terminal of the data counter 32 and the output terminal of the AND gate 52 is connected to the input terminal of the binary point counter 54. Thus, the mode control 30 gates the AND gate 28 to allow data to be transferred from the pulse height analyzer 22 to the data counter 32, gates the AND gates represented by the AND gate 48 to allow the transfer of binary point data from the binary point counter 54 to the data counter 32, and gates the AND gate 52 to allow data from the scaling circuit 60 to be transferred to the input of the binary point counter 54. Also, the mode control 30 in conjunction with the delay circuit 56 gates the AND gate 50 to reset the data counter 32.

The output terminal of the binary point counter 54 is also connected to the pulse duration circuit 26 in the light source control circuit 18. A control line connects the binary point counter to the mode control 30. The output terminal of the scaling circuit 60 is connected to the delay circuit 56 and to the transfer terminal of the data storage register 34.

The input terminal of the scaling circuit 60 is connected to the output of a variable oscillator circuit 62. The variable oscillator circuit 62 is also coupled through a motor drive circuit 64 to a stepping motor 66 for controlling the movement of the detector probe 20 along a rectilinear path of travel. As illustrated, the frequency of the oscillator circuit 62 is controlled by a motor speed control 68 in order to vary the rate of travel of the probe 20. Accordingly, the motor speed control 68 not only varies the rate of travel of the probe 20, but also by setting the frequency of oscillation of the oscillator circuit 62, selects the time interval for counting the data representative of radiation activity.

As illustrated in FIG. 2, the output terminal of the pulse duration circuit 26 is applied to one of the input terminals of a light source drive circuit 70. The other input terminal of the light source drive circuit 70 is coupled to the movable contact of an intensity control potentiometer 72 having one of its stationary terminals connected directly to ground and its other stationary contact coupled to the output terminal of the differential amplifier 46. The gain of the amplifier 46 is controlled by the enhancement control 74 which, when varied, varies the contrast enhancement of the recorded presentation.

The output terminal of the light source drive circuit 70 is coupled directly to a light source 76 for modulating the intensity and controlling the duration of light pulses developed by the light source. The light source 76 may take the form of a recording device such as that illustrated in the above-referenced U.S. Pat. No. 3,159,744 or alternatively, may take the form of the printout device disclosed in the above-mentioned Pat. Application to Brunnett et al., Ser. No. 156,913 For purposes of illustration, the light source 76 is shown in conjunction with a film plate 78 for providing a permanent graphical recording of the levels of radiation activity.

In the operation of the automatic calibrate system, the mode control 30 is set to "calibrate" which causes signals to be applied to the AND gates 28 and 52 thereby causing these gates to open and allow data to be transferred through the gates. During the calibrate mode, the AND gates 48 and 50 remain closed thereby preventing the transfer of data through these gates.

For automatic calibration, the detector probe 20 is manually positioned over the organ under examination until a maximum reading is obtained by the indicator on the rate meter 24. The electrical pulses developed by the detector probe 20 are then applied through the pulse height analyzer 22 and the AND gate 28 to the data counter 32. The data counter 32 begins counting electrical pulses in the train of pulses for a predetermined integration interval or integration distance.

The integration interval terminates on the occurrence of two events, to wit, the data counter has completed a count of at least 256 counts and the binary point counter 54 has reached a count of $2^N$ where N is an integer. In other words, the data counter 32 continues to count data representative of radiation activity at the "hot spot" until the number of counts in the data counter 32 and binary point counter 54 have satisfied the required conditions. The operation of the data counter 32 and the binary point counter 54 will be described subsequently in more detail with reference to FIG. 5.

Once the required conditions have been satisfied, AND gates 28 and 52 are closed thereby preventing additional data from being transferred into the data counter 32 and the binary point counter 54. The binary data in the data counter 32 is then transferred to the reference storage register 36 where that information is then stored. Signals representative of the data count stored in the reference storage register 36 are then applied to the normalizing circuit 42, which in turn applies an analog signal through the amplifier 44 to the digital-to-analog converter 38 to modify the signals developed by the digital-to-analog converter 38 during the normal scanning operation.

For normal scanning operation, the mode control 30 is set at "normal operation" which causes the AND gates 28, 48 and 50 to open and the AND gate 52 to remain closed. During normal scanning operation, data from the pulse height analyzer 22 is applied through the AND gate 28 to the data counter 32. The data counter 32 is allowed to count for an integration interval or integration distance which is selected by the motor speed control 68. Thus, after a predetermined number of oscillations by the oscillator circuit 62, the scaling circuit 60 develops a pulse which causes data to be transferred from the data storage register 34 to the digital-to-analog converter 38. After a preselected interval of time, the delay circuit 56 develops a pulse which is applied through the AND gate 50 to reset the data counter 32 for another counting operation over a second time interval. Each time interval is equal to the time the detector probe 20 remains in a given position before being moved by the stepping motor 66 an incremental distance. The data counter 52 is reset at a predetermined delay time after actuation of the stepping motor 66 to the next incremental position.

The binary information from the data storage register 34 is applied to the digital-to-analog converter 38. The converter 38 develops an analog signal having a value representative of the pattern of binary signals applied to the converter. The analog signal developed by the digital-to-analog converter 38 is modified by the signal developed by the amplifier 44 in the calibration circuit 12 so that the analog signal developed by the converter 38 remains within a predetermined range of values even though this signal has a value representative of the data applied to the converter by the data storage register 34. The operation of the digital-to-analog converter 38 and the normalizing circuit 42 will be described subsequently in more detail with reference to FIGS. 3 and 4.

The analog signal developed by the digital-to-analog converter 38 is applied through an amplifier 40 and through the contrast enhancement control 74 to the differential amplifier 46. The output signal from the amplifier 46 is coupled through the potentiometer 72 to the light source drive circuit 70 in order to modulate the intensity of the light source in response to variations in amplitude of the analog signal developed by the digital-to-analog converter 38. Also, the output signals developed by the reference storage register 36 are applied to the pulse duration circuit 26, as will hereinafter be described in more detail, in order to develop a signal which when applied through the light source drive circuit 70 sets the duration of each light pulse to properly expose the film at the calibration point.

Thus, the detector probe 20 is positioned over an area of maximum radiation activity or a "hot spot," the probe 20 develops a train of electrical pulses representative of the level of radiation activity measured by the detector, and the data counter 32 counts the number of pulses for a preselected number of intervals of time. The number of counts developed by the data counter 32 is then divided by the number of intervals of counting time by the binary point counter 54 in order to obtain an average number of electrical pulses occurring in one interval of time. By counting over several intervals of time, the average number of electrical pulses may be determined with a high degree of statistical accuracy. This divisional operation will be described subsequently in more detail with reference to FIG. 5.

Data representative of the average number of electrical pulses occurring in one interval of time is then stored in the reference storage register 36 and is applied to the normalizing circuit 42 for modifying the signals developed by the analog converter 38 during normal scanning operation. In the normal scanning operation, the radiation detector probe 20 moves along a rectilinear path of travel and is moved for incremental distances after a preselected number of oscillations by the oscillator circuit 62. Each time the detector probe 20 is moved an incremental distance, data which has been accummulated in the data counter 32 at the previous detector location is transferred from the data storage register 34 to the digital-to-analog converter 38. The signal developed by the digital-to-analog converter 38 is modified by the modifying circuit 42 and its associated amplifier 44 so that the value of the output signal developed by the digital-to-analog converter 38 remains within a predetermined range of values and remains representative of the number of counted pulses accumulated at each detector position.

The analog signal developed by the digital-to-analog 38 is applied through the amplifiers 40, 46 and light source drive circuit 70 to modulate the intensity of each pulse of light developed by the light source 76. The signals developed by the pulse height analyzer 22 are applied to the pulse duration circuit 26 and are modified by the data stored in the reference storage register 36 to develop a signal which when applied through the light source drive circuit 70 sets the duration of each light pulse.

Figure 3:
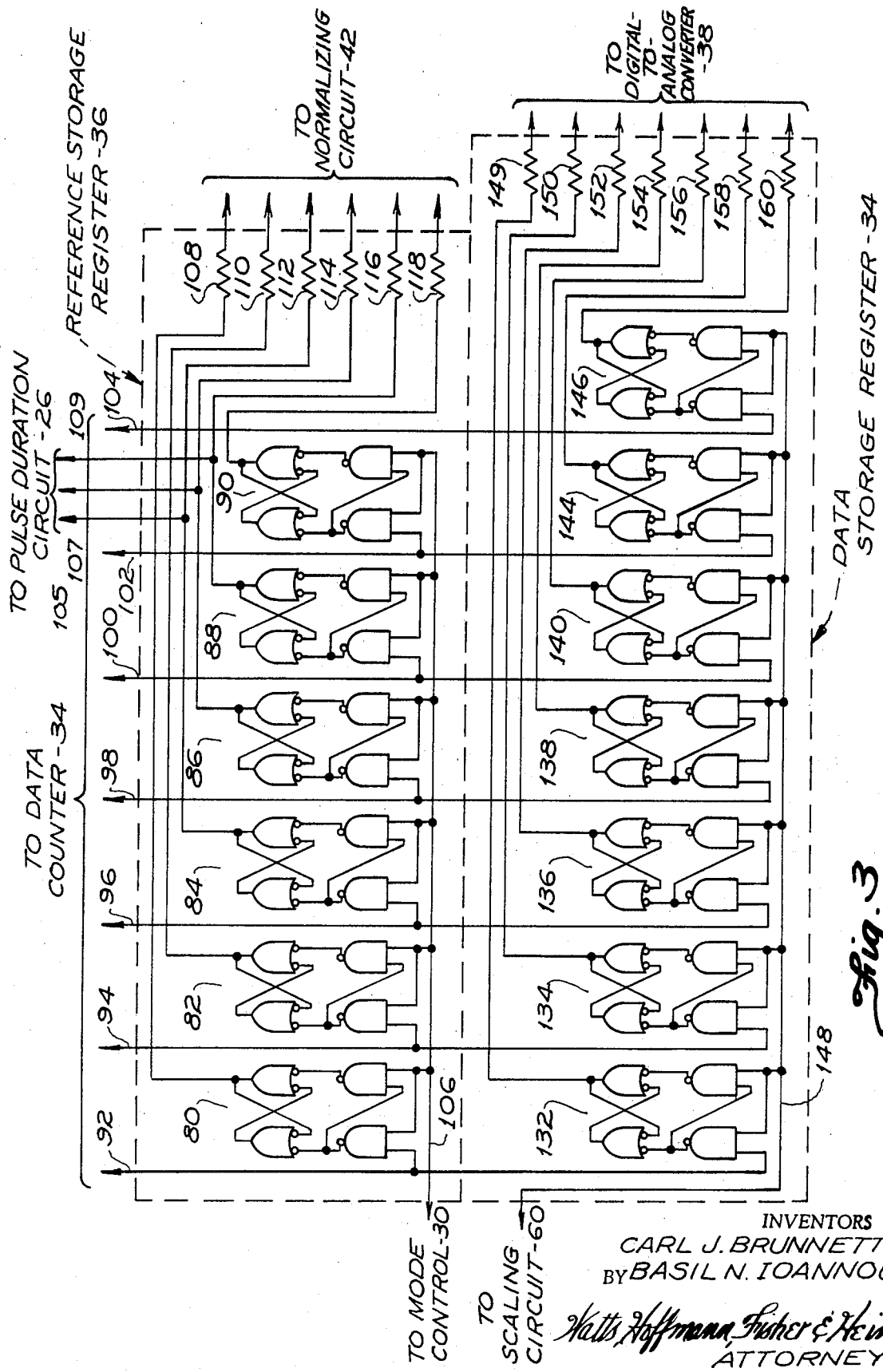
FIG. 3 is an electrical schematic diagram illustrating in more detail the reference storage register and data storage register circuitry of the calibrating system shown in FIG. 1.
Figure 4:
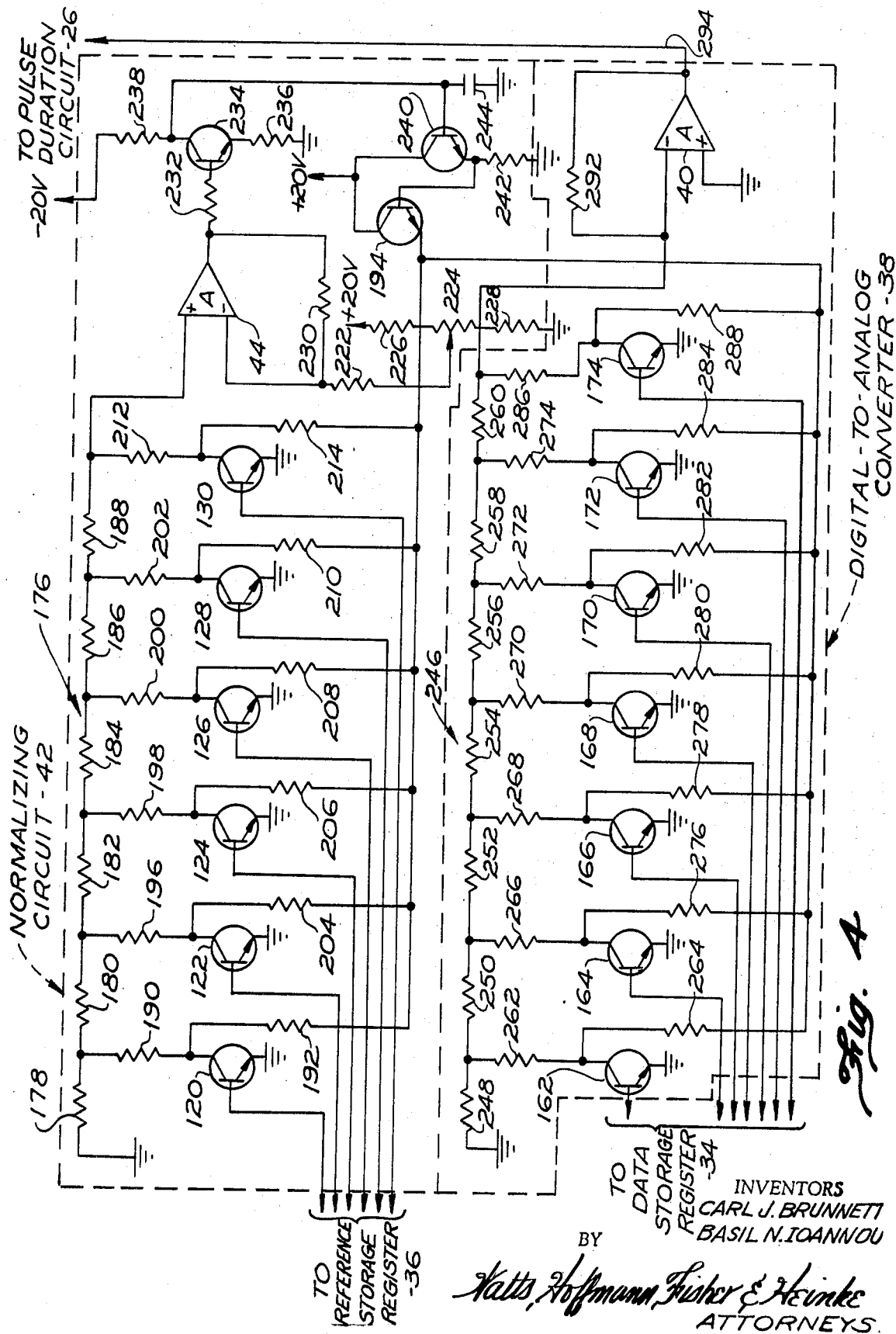
FIG. 4 is an electrical schematic diagram illustrating in more detail the normalizing circuitry and the digital-to-analog converter circuitry of the calibrating system shown in FIG. 1.

Reference is now made to FIGS. 3 and 4 which illustrate in more detail the data storage register 34, reference storage register 36, digital-to-analog converter 38, normalizing circuit 42, and amplifiers 40, 44.

More particularly, the reference storage register 36 is comprised of six binary storage section 80, 82, 84, 86, 88, 90 each having their input terminals connected to the data counter 34 by the output lines 92, 94, 96, 98, 100, 102, 104, and to the pulse duration circuit by the output lines 105, 107, 109. The input terminals of the storage stages 80 through 90 are connected by a common line 106 to the mode control 30. The output terminals of the storage stages 80, 82, 84, 86, 88, 90 are respectively coupled through the resistors 108, 110, 112, 114, 116, 118 to the base terminals of the NPN transistors 120, 122, 124, 126, 128, 130, respectively, in the normalizing circuit 42.

The data storage register 34 is comprised of seven binary storage stages 132, 134, 136, 138, 140, 144, 146, each having their input terminals connected to the data counter 34 by the input lines 92, 94, 96, 98, 100, 102, 104, respectively. The reset terminals of the storage stages 132 through 146 are similarly connected by a common line 148 to the sealing circuit 60. The output terminals of the storage stages 132, 134, 136, 138, 140, 144, 146 are respectively connected through resistors 149, 150, 152, 154, 156, 158, 160 to the base terminals of NPN transistors 162, 164, 166, 168, 170, 172, 174 respectively, in the digital-to-analog converter 38.

The normalizing circuit 42 is comprised of the six NPN transistors 120 through 130 which operate in conjunction with a resistive ladder network 176. The ladder network includes a string of series-connected resistors 178, 180, 182, 184, 186, 188, which are connected between the non-inverting input terminal of the differential amplifier 44 and ground. The collector of transistor 120 is connected through a resistor 190 to the junction point between the resistors 178, 180, and is also connected through a resistor 192 to the emitter of an NPN transistor 194. Similarly, the collectors of transistors 122, 124, 126, 128 are respectively connected through resistors 196, 198, 200, 202 to the junction points between the resistors 180, 182, resistors 182, 184, resistors 184, 186 and resistors 186, 188, respectively. The collectors of transistors 122, 124, 126, 128 are respectively connected through the resistors 204, 206, 208, 210 to the emitter of the transistor 194. In a similar manner, the collector of transistor 130 is connected through a resistor 212 to the non-inverting input terminal of amplifier 44 and is also connected through a resistor 214 to the emitter of the transistor 194.

The non-inverting input terminal of amplifier 44 is connected through a resistor 222 to the movable contact of a potentiometer 224 having one of its stationary contacts connected through a resistor 226 to a positive 20-volt supply source. The other stationary contact potentiometer is connected through a resistor 228 to ground.

The output terminal of differential amplifier 44 is connected through a feedback resistor 230 to the inverting input terminal of this amplifier and is also connected through a resistor 232 to the base terminal of an NPN transistor 234. The emitter of transistor 234 is coupled through a resistor 236 to ground and the collector of this transistor is coupled through a resistor 238 to a negative 20-volt supply source.

Also connected to the collector of transistor 234 is the base of a transistor 240 having its emitter connected through a resistor 242 to ground and its collector connected in common with the collector of transistor 194 to the positive 20 volt supply. The emitter of transistor 240 is connected directly to the base of transistor 194 and the base of transistor 240 is coupled through a capacitor 244 to ground.

The digital-to-analog converter 38 is comprised of the seven NPN transistors 162 through 174 which operate in conjunction with a resistive ladder network 246. The ladder network 246 includes a string of series-connected resistors 248, 250, 252, 254, 256, 258, 260 which are connected between the non-inverting input terminal of the differential amplifier 40 and ground. The collector of transistor 162 is connected through a resistor 262 to the junction point between the resistors 248, 250 and is also connected through a resistor 264 to the emitter of the NPN transistor 194. Similarly, the collectors of transistors 164, 166, 168, 170, 172 are respectively connected through resistors 266, 268, 270, 272, 274 to the junction points between the resistors 250, 252, resistors 252, 254, resistors 254, 256 and resistors 256, 258, and resistors 258, 260. The collectors of transistors 164, 166, 168, 170, 172 are respectively connected through the resistors 276, 278, 280, 282, 284 to the emitter of the transistor 194. In a similar manner, the collector of transistor 174 is connected through a resistor 286 to the inverting input terminal of amplifier 40 and is also connected through a resistor 288 to the emitter of the transistor 194.

The non-inverting input terminal of differential amplifier 40 is connected directly to ground and the output of this amplifier is fed back through a resistor 292 to the inverting input terminal. The output of amplifier 40 is also connected to the pulse duration circuit 26 through an output line 294.

In operation, the reference storage register stores patterns of binary data representative of the average number of counts received during a single time interval at the "hot spot." This data is transferred to the normalizing circuit 42 upon receipt of a transfer signal from the mode control 30. The ladder network 176 converts the binary data to an analog signal having a value which may be represented by the equation;

$$V_0 = [(N)(V)]/M \qquad (1)$$

where $V_0$ is equal to the amplitude of the analog signal developed by the ladder network 176, $N$ is equal to the actual number of counts stored in the reference storage register 36, $V$ is equal to the source voltage potential which is applied to the ladder network 176 and which establishes a binary "1" signal, and $M$ is equal to one plus the maximum number of counts which may be stored in the reference storage register 36.

The signal $V_0$ appears at the non-inverting input terminal of the differential amplifier 44 and is applied through the amplifier to the transistors 234, 240, 194. The signal developed by transistor 194 modifies the voltage potential $V$ applied to the ladder network 176 through the resistors 192, 204, 206, 208, 210, 214. This negative feedback loop establishes the value of $V$ such that $V_0$ equals the voltage at the movable contact of potentiometer 224.

Since the voltage potential $V$ which is applied to the ladder network 176 is also applied to the ladder network 246, the output voltage developed by the ladder network 246 is equal to the ratio of the number of counts stored in the data storage register and the number of counts stored in the reference storage register, and may be expressed by the following equation;

$$V_D = (N_D/N_R) V_R, \qquad (2)$$

where $V_D$ is equal to the output of amplifier 40, $N_D$ is equal to the number of counts stored in the data storage register, $N_R$ is equal to the number of counts stored in the reference storage register, and $V_R$ is equal to the reference coltage established by potentiometer 224.

Figure 5:
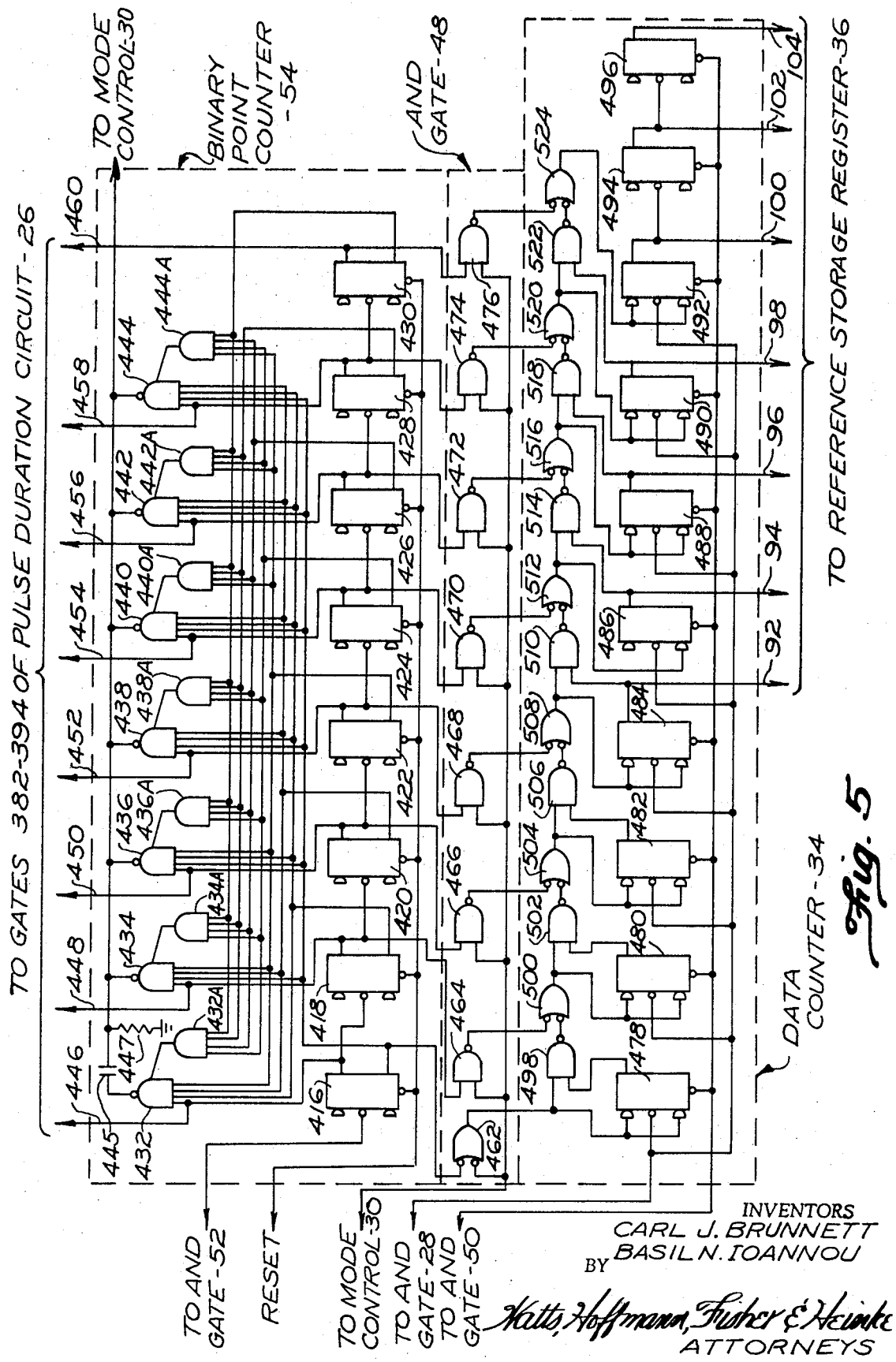
FIG. 5 is an electrical schematic diagram illustrating in more detail the data counter and binary counter circuitry of the calibrating system shown in FIG. 1; and, FIG. 6 is an electrical schematic diagram illustrating in more detail the pulse duration circuitry of the calibrating system shown in FIG. 2.

Reference is now made to FIG. 5 which illustrates in more detail the binary point counter 54, the AND gate 48, and the data counter 34. More particularly, the binary point counter 54 is comprised of eight J-K flip-flops 416, 418, 420, 422, 424, 426, 428, 430. The "1" terminal of each of the flip-flops 416 through 430 is connected to the toggle terminal of the following flip-flop and the reset terminals of these flip-flops are connected in common to the mode control 30.

The binary point counter 54 also includes seven four-input gates 432, 434, 436, 438, 440, 442, 444, each having an associated four-input expander 432A, 434A, 436A, 438A, 440A, 442A, 444A. The output terminals of the four-input gates 434 through 444 are connected in common to the mode control 30. The output terminal of four-input gate 432 is coupled through a capacitor 445 to the output terminal of gate 434 and is also connected through a resistor 447 to ground.

The "1" terminals of each of the J-K flip-flops 416 through 428 are each connected to one of the input terminals of the four-input gates 432 through 444, respectively. The "0" terminal of flip-flop 416 is connected to one of the input terminals of the gates 434 through 444. The "0" terminal of the flip-flop 418 is connected to one of the input terminals of the gates 432, and 436 through 444, and the "0" terminal of the flip-flop 420 is connected to one of the input terminals of the gates 432, 434, and 438 through 444. Also, the "0" terminal of the flip-flop 432 is connected to one of the input terminals of the gates 432 through 436 and 440 through 444, the "0" terminal of flip-flop 424 is connected to one of the input terminals of the expanders 432A through 438A, 442A and 444A, the "0" terminal of the flip-flop 426 is connected to one of the input terminals of the expanders 432A through 440A, and 444A, and the "0" terminal of the flip-flop 428 is connected to one of the input terminals of the expanders 432A through 442A. The "0" terminal of the flip-flop 430 is connected to one of the input terminals of the expanders 432A through 444A.

The "1" terminals of the flip-flops 416 through 430 also provide the output terminals 446, 448, 450, 452, 454, 456, 458, 460, respectively, which are coupled to the pulse duration circuit 26. Additionally, the "0" terminals of the flip-flop 416 are connected to one of the input terminals of an OR gate 462. The "1" terminals of the J-K flip-flops 418 through 430 are respectively coupled to one of the input terminals of a corresponding one of seven AND gates 464, 466, 468, 470, 472, 474, 476. The other input terminal of the OR gate 462 and the other input terminal of the AND gates 464 through 476 are connected in common to the mode control 30. Thus, the OR gate 462 and the AND gates 464 through 476 and their associated circuitry generally comprise the AND gate 48 as illustrated in FIG. 1.

The data counter 34 is generally comprised of ten J-K flip-flops 478, 480, 482, 484, 486, 488, 490, 492, 494, 496 which are connected as a parallel counter. Accordingly, the toggle terminals of each of the flip-flops 478 through 496 are connected in common to the output of AND gate 28 and the reset terminals of these flip-flops are connected in common to the output of AND gate 50. The "1" terminal of the flip-flop 478 is connected to one of the input terminals of an AND gate 498 having its output terminal connected to one of the input terminals of an OR gate 500. The other input terminal of the AND GATE 498 is connected to the output terminal of the OR gate 462 and the other input terminal of the OR gate 500 is connected to the output terminal of the AND gate 464. The output terminal of OR gate 462 is also connected to the input terminals of the flip-flop 478 and the output terminal of the OR gate 500 is connected to the input terminals of the flip-flop 480.

The output terminal of OR gate 500 is also connected to one of the input terminals of an AND gate 502 having its output terminal connected to one of the input terminals of an OR gate 504. The other input terminal of the AND gate 502 is connected to the "1" terminal of flip-flop 480 and the other input terminal of the OR gate 504 is connected to the output terminal of AND gate 466.

The output terminal of OR gate 504 is connected to the input terminals of the flip-flop 482 and to one of the input terminals of an AND gate 506 having its output terminal connected to one of the input terminals of an OR gate 508. The other input terminal of AND gate 506 is connected to the "1" terminal of flip-flop 482 and the other input terminal OR gate 508 is connected to the output terminal of AND gate 468. The output terminal of OR gate 508 is connected to the input terminals of the flip-flop 484 and to the input terminal of an AND gate 510 having its output terminal connected to one of the input terminals of an OR gate 512. The other input terminal of AND gate 510 is connected to the "1" terminal of flip-flop 484 and the other input terminal of OR gate 512 is connected to the output terminal of AND gate 470.

Similarly, the output terminal of OR gate 510 is connected to the input terminals of the flip-flop 486 and to one of the input terminals of an AND gate 514 having its output terminal connected to one of the input terminals of an OR gate 516. The other input terminal of AND gate 514 is connected to the "1" terminal of flip-flop 486 and the other input terminal of OR gate 516 is connected to the output terminal of AND gate 472. In a similar manner, the output terminal of OR gate 516 is connected to the input terminals of flip-flop 488 and to one of the input terminals of AND gate 518 having its output terminal connected to an OR gate 520. The other input terminal of AND gate 518 is connected to the "1" terminal of flip-flop 488 and the other terminal of OR gate 520 is connected to the output terminal of AND gate 474.

The output terminal of OR gate 520 is connected to the input terminals of a flip-flop 490 and to one of the input terminals of an AND gate 522 having its output terminal connected to one of the input terminals of an OR gate 524. The other input terminal of AND gate 522 is connected to the "1" terminal of flip-flop 490 and the other input terminal of OR gate 524 is connected to the output terminal of AND gate 476. The output terminal of OR gate 524 is connected to the input terminals of the flip-flop 492 and the "1" terminal of this flip-flop is connected to the toggle terminal of the flip-flop 494. Similarly, the "1" terminal of flip-flop 494 is connected to the toggle terminal of flip-flop 496. As illustrated, the "1" terminals of flip-flops 484, 486, 488, 490, 492, 494, 496 provide the input terminals 92, 94, 96, 98, 100, 102, 104, respectively to the reference storage register 36.

During the calibrate mode of operation, both the binary point counter 54 and the data counter 34 are initially reset. A binary "0" signal is applied to the OR gate 462 and the AND gate 464 through 476 so that counting in the data counter begins at the first stage, i.e., with flip-flop 478.

Once the detector probe 20 has been positioned over a "hot spot," or alternatively, any desired calibration point, the data counter 34 begins counting the pulses in the train of electrical pulses developed by the detector probe 20. Simultaneously, the binary point counter 54 counts the output signals developed by the scaling circuit 60 through the AND gate 52. The AND gates 28 and 52 are closed when the above-mentioned conditions of a total count in the data counter 34 being equal to or greater than 256 and the binary point counter 54 having attained a count of $2^N$ where $N$ is an integer. These conditions are met when the input line 102 attains a binary "1" level and when only one of the flip-flops 416 through 430 in the binary point counter 54 is in a "set" condition.

The gates 432, 444 and the expanders 432A through 444A sense the condition of the binary point counter 54 and when one of the flip-flops 416 through 430 is in a "set" condition, a signal is applied to the mode control 30, assuming the line 102 has attained a binary "1" level for opening the AND gates 28 and 52 to prevent further counts from being applied to the data counter 32 and the binary point counter 54, respectively. The count attained by the data counter 34 is then applied to the reference storage register 36.

During the normal scanning operation, the AND gate 52 remains closed and the AND gate 28 again opens to allow pulses from the detector probe 20 to be applied through the pulse height analyzer 22 to the data counter 32. At this point, a binary "1" signal is applied to the OR gate 462 and the AND gates 464 through 476 which allows the flip-flop in the binary point counter 54 which is in the "set" condition to establish the binary point or starting point in the data counter 32. Thus, during the scanning mode of operation, the data counter commences counting at that counting point or binary point and continues to count for each interval of time. The data counter 34 is again reset by a signal developed by the delay circuit 56 after the completion of a predetermined counting interval.

Figure 6:
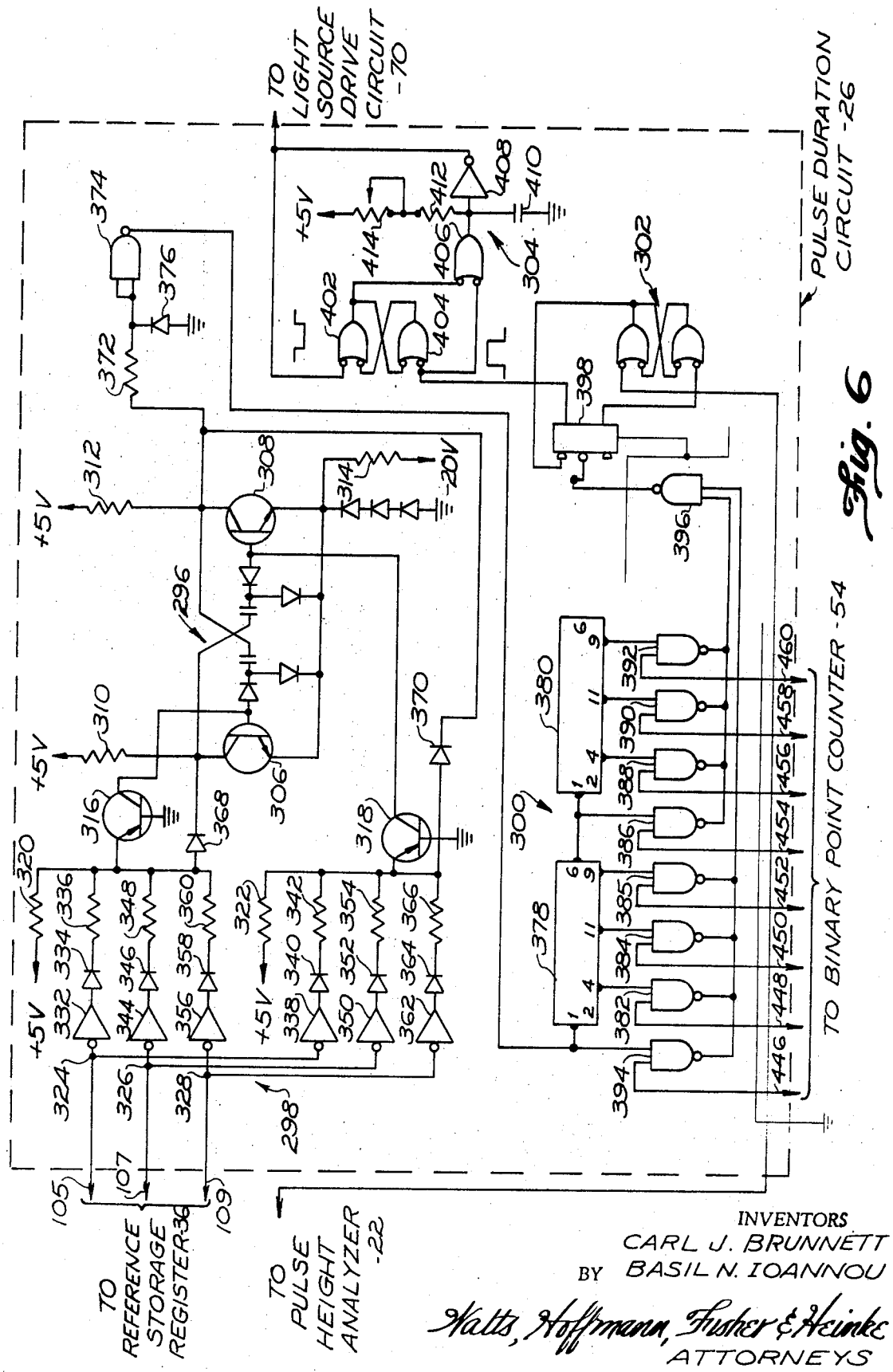

Reference is now made to FIG. 6 which illustrates in more detail the pulse duration circuit 26. Pulse duration circuit 26 is generally comprised of an oscillator circuit 296, a frequency control circuit 298 for controlling the frequency of oscillation of the oscillator circuit 296, a scale-down counter 300, a bistable multivibrator 302 and a circuit 304 for adding an incremental width to each signal pulse.

More particularly, the oscillator 296 is a free running, bistable multivibrator comprised of a pair of NPN transistors 306, 308 which are supplied with power by a positive 5 volt supply source through the resistors 310, 312 and by a negative 20 volt supply source through the resistor 314. The frequency of oscillation of the oscillator circuit 296 is controlled by the level of conduction of the PNP transistors 316, 318. Accordingly, the collector of transistor 316 is coupled to the base of transistor 306 and the collector of transistor 318 is coupled to the base of transistor 308. The base terminals of transistors 316, 318 are connected directly to ground and the emitters of these transistors are respectively coupled through resistors 320, 322 to the positive 5 volt supply source.

The output lines 105, 107, 109 of the reference storage register 36 are each respectively connected to the juncture points 324, 326, 328.

The juncture point 324 is connected through a series connected amplifier 332, diode 334, and resistor 336 to the emitter of transistor 316. Also, the juncture point 324 is connected through a series connected amplifier 338, diode 340, and resistor 342 to the emitter of the transistor 318. Similarly, the juncture point 326 is connected through a series connected amplifier 344, diode 346, and resistor 348 to the emitter of the transistor 316, and the juncture point 326 is also connected through a series connected amplifier 350, diode 352, and resistor 354 to the emitter of the transistor 318. In a similar manner, the juncture point 328 is connected through a series connected amplifier 356, diode 358, and resistor 360 to the emitter of the transistor 316 and the juncture point 328 is also connected through a series connected amplifier 362, diode 364, and resistor 366 to the emitter of the transistor 318. As illustrated, the emitter of transistor 316 is additionally coupled to the collector of the transistor 306 through a diode 368 and the emitter of the transistor 318 is coupled to the collector of transistor 308 through a diode 370.

The output signal developed by the oscillator circuit 296 is coupled through a resistor 372 to the input terminals of an AND gate 374 having its output terminal connected to the scale-down counter 300. A diode 376 is coupled between the input terminals of the AND gate 374 and ground and is polarized such that the cathode of the diode is coupled to the input terminals of the AND gate.

The scale-down counter 300 generally includes a pair of "divide by 16" type counters 378, 380 having their input terminal coupled to the output terminal of the AND gate 374 and their output terminals coupled to one of the input terminals of seven AND gates 382, 384, 385, 386, 388 390, 392. The input terminal of the counters 378, 380 is also connected directly to one of the input terminals of an AND gate 394. The other input terminals of each of the AND gates 382, 384, 385, 386, 388, 390, 392, and 394 are respectively coupled to the output terminals 448, 450, 452, 454, 456, 458, 460, 444 of binary point counter 54. The output terminals of the AND gates 382, 384, 385 are connected in common to one of the input terminals of an AND gate 396, and the output terminals of the AND gates 386, 388, 390, 392 are connected in common to another of the input terminals of the AND gate 396.

As illustrated, the output terminals of the AND gate 396 are connected in common to the trigger terminal of a dual J-K flip-flop 398. The "1" terminal of the flip-flop 398 is connected to the incremental adding circuit 304 and the "0" terminal of the flip-flop is connected to the bistable multivibrator circuit 302.

The incremental adding circuit is generally comprised of a dual NAND gate flip-flop comprised of NAND gates 402, 404, having its output terminal connected to one of the input terminals of a NAND gate 406. The input terminal of the flip-flop including NAND gates 402, 404 is connected to the "1" terminal of the J-K flip-flop 398 and the other input terminal of the NAND gate 406 is also connected to the "1" terminal of the J-K flip-flop 398.

The output of NAND gate 406 is coupled to the input terminal of an inverter 408, is coupled through a capacitor 410 to ground, and is coupled through a series connected resistor 412 and potentiometer 414 to the positive five volt supply source. In addition, the output terminal of the inverter 408 is connected directly to the light source drive circuit 70 and to an input terminal of the NAND gate 402 of the dual NAND gate flip-flop.

Thus, the data in the reference storage register 36 is applied to the juncture points 324, 326, 328 and transistors 316, 318 to control the frequency of oscillation of the oscillator circuit 296. Thus, the frequency of oscillation of the oscillator circuit 296 is directly proportional to the number of counts $N_R$ in the reference storage register 36. The output signals from the oscillator circuit 296 are applied to the counters 378, 380 and these counters develop a pattern of binary signals which are applied to the AND gates 282 through 294. When a matched condition is reached between the output of the counters 378, 380 and the pattern of signals developed by the binary point counter 54, a signal is applied to the trigger terminal of the J-K flip-flop 398 by the AND gate 396. The output signal from the J-K flip-flop 398 is applied to the flip-flop 302 and gate 400 for resetting the counters 378, 380 and the J-K flip-flop 398. The output signal from the J-K flip-flop 398 is a pulse signal having a direction which is directly proportional to the value of the number of counts $N_R$ in the reference storage register 36. This signal is applied to the dual NAND gate flip-flop including the NAND gates 402, 404. The output signal developed by the dual NAND gate flip-flop is applied through an OR gate 406 to recharge the capacitor 410 such that a constant incremental width is added to each of the pulses developed by the J-K flip-flop 98. The pulses generated by the OR gate 406 are applied through the inverter circuit 408 to the light source drive circuit 70 for flashing the light source.

The contrast of the output presentation may be either increased or decreased by varying the potentiometer 74A in order to vary the gain of the differential amplifier 46. As previously indicated, the output signal developed by the differential amplifier 46 when applied through the intensity control 72 controls the intensity of the light flash. Thus, as the position of potentiometer 74A is varied, the maximum output signal developed by the differential amplifier remains equal to the reference voltage source coupled to the input terminal of the amplifier, however, changes in the value of the input signals to this amplifier cause a greater change in the amplitude of the output signal. By increasing the gain of this amplifier by the gain control 74, the contrast of the system may be substantially enhanced. Since the potentiometer 74A is coupled to a reference voltage source $V_R$, the position of the potentiometer does not affect the intensity of the light source at the "hot spot" or calibration point.

The intensity control 72 may be varied in order to adjust the amplitude of the signal developed by the differential amplifier 46 so that the relative intensity of the output presentation may be controlled. Since the potentiometer of the intensity control 72 is referenced to ground, the position of this potentiometer will have no effect on the threshold of exposure of the film plate 78. Accordingly, once the scanner has been calibrated at a "hot spot" or a calibrate point, the instrument remains calibrated regardless of variations in color enhancement or intensity variations.

It should now be apparent that the objects initially set forth at the outset of this specification are successfully achieved by the present invention.

Although one embodiment of the invention has been described and illustrated, it is apparent to one skilled in the art that various changes and modifications may be made without departing from the spirit and scope of the invention.

Having thus described our invention, we claim:

1. In a scintillation apparatus, a radiation detector including circuitry for developing a train of electrical pulses representative of the value of radiation activity measured by the detector, the improvement comprising:

counting circuit means coupled to said detector circuitry for developing a plurality of patterns of electrical signals each having a value representative of the number of electrical pulses received during a predetermined time interval;

digital-to-analog converter means coupled to said counting circuit means for converting said plurality of patterns of electrical signals to a plurality of output signals each having a value representative of one of said pattern of signals;

automatic calibrating circuit means coupled to said digital-to-analog converter means for modifying the values of each of said plurality of output signals in a manner so that substantially all of the values of said plurality of output signals remain within a predetermined range of values representative of the value of said pattern of signals developed by said counting circuit means; and, display means coupled to said converter means for providing output presentations representative of the values of said output signals to provide a visual representation of measured radiation activity.

2. An apparatus as defined in claim 1 wherein said counting circuit means includes gating means for setting the starting point of said counting circuit means and said automatic calibrating circuit means includes a binary point counter including counting means for counting the number of predetermined time intervals and memory circuit means for actuating said gating means in said counting circuit means to set a binary point in said counting circuit means in response to the number of counted time intervals to thereby cause the pattern of signals developed by said counting circuit means to be representative of the average number of counts per interval of time.

3. An apparatus as defined in claim 2 wherein said counting circuit means is a binary counter and said gating means includes circuit means for setting the binary point of said binary counter.

4. An apparatus as defined in claim 2 including a reference storage register coupled to said counting circuit means for storing a pattern of electrical signals representative of the average number of counts per interval of time; and, normalizing circuit means coupled to said reference storage register for developing a modifying signal having a value representative of a said pattern of electrical signals stored in said reference storage register.

5. An apparatus as defined in claim 4 wherein said counting circuit means is a binary counter and said gating means includes circuit means for setting the binary point of said binary counter.

6. An apparatus as defined in claim 5 including a reference storage register coupled to said counting circuit means for storing a pattern of binary signals representative of the average number of counts per interval of time; and, normalizing circuit means coupled to said reference storage register for developing an analog signal having a value representative of a said pattern of binary signals stored in said reference storage register.

7. An apparatus as defined in claim 4 including a data storage register interposed between said counting circuit means for storing a plurality of patterns of binary signals each representative of one of the plurality of patterns of electrical signals developed by said counting circuit means; and, said digital-to-analog converter means including circuitry for converting each of said plurality of patterns of binary signals to an analog signal having a value representative of the corresponding converted pattern of signals.

8. An apparatus as defined in claim 6 including a data storage register interposed between said counting circuit means for storing a plurality of patterns of binary signals each representative of one of the plurality of patterns of electrical signals developed by said counting circuit means; and, said digital-to-analog converter means including circuitry for converting each of said plurality of patterns of binary signals to an analog signal having a value representative of the corresponding converted pattern of signals.

9. An apparatus as defined in claim 7 including control means coupled to said normalizing circuit means for applying said modifying signal to said digital-to-analog converter means for varying the value of said analog signal in response to variations in the pattern of electrical signals stored in said reference storage to thereby modify said analog signal in response to the number of counts stored in said reference storage register.

10. An apparatus as defined in claim 9 includin pulse duration circuit means coupled to said reference storage register for developing a train of electrical pulses each having a width representative of the value of a pattern of electrical signals stored in said reference storage register so that the width of said electrical pulses is representative of the number of counts stored in said reference storage register.

11. An apparatus as defined in claim 10 including a light source coupled to said pulse duration circuit means for developing a train of light flashes each having a time duration representative of the width of said electrical pulses developed by said pulse duration circuit.

12. In a scintillation apparatus, a radiation detector including circuitry for developing a train of electrical pulses representative of the value of radiation activity measured by the detector, the improvement comprising:

counting circuit means coupled to said detector circuitry for developing a plurality of patterns of electrical signals each having a value representative of the number of electrical pulses received during a predetermined time interval;

digital converter means coupled to said counting circuit means for converting said plurality of patterns of electrical signals to a plurality of output signals each having a value representative of one of said pattern of signals;

contrast enhancement means including;

a differential amplifier means for amplifying said output signal and having one input terminal coupled to said digital-to-analog converter means and another input terminal connected to a source of reference potential, and an output terminal;

display means coupled to said output terminal of said differential amplifier for providing output presentations representative of the values of signals developed by said differential amplifier; and, variable circuit means for varying the gain of said differential amplifier in order to vary the amplification of signals applied to said recording means with reference to said reference potential.

13. An apparatus as defined in claim 12 including an intensity control having control means for attenuating the value of signals applied by said differential amplifier to said recording means.

14. A method of calibrating a scintillation recording apparatus comprising the steps of:

positioning a radiation detector in proximity to a subject under examination and in proximity to an area of substantially maximum radiation activity;

developing a train of electrical pulses representative of the level of the radiation activity measured by the detector;

electrically counting the number of electrical pulses for d intervals of time;

electrically dividing the number of electrical pulses by d in order to obtain an average number of electrical pulses occurring in one interval of time;

developing a calibration signal having a value representative of the average number of electrical pulses in one interval of time;

positioning the radiation detector in proximity to another area of radiation activity;

developing a second train of electrical pulses representative of the radiation activity measured by the detector at the second position;

counting the number of electrical pulses in the second train of pulses which are developed in a predetermined interval of time;

developing an output signal having a value representative of the number of counted pulses in the second train of pulses; and, modifying the value of the output signal with the calibration signal so that the value of the output signal substantially remains within a predetermined range of values and representative of the number of pulses in the second train of pulses.

15. A method as defined in claim 14 including the step of applying the output signal to an indicator means for providing an output presentation representative of the number of counted pulses in the second train.

* * * * *